United States Patent
Whitcomb et al.

[11] 3,748,753
[45] July 31, 1973

[54] ELECTRO-OPTIC DEVICE FOR IMPROVING READING ABILITY

[76] Inventors: Elmer W. Whitcomb, 74 E. Rogues Path; Joseph W. Raba, 30 Peachtree Ln., both of Huntington, N.Y. 11746

[22] Filed: Feb. 15, 1972

[21] Appl. No.: 226,459

[52] U.S. Cl............................. 35/35 B, 350/160 R
[51] Int. Cl..................... G09b 17/02, G09b 17/04
[58] Field of Search............... 350/160 LC; 35/35 B

[56] References Cited
UNITED STATES PATENTS

| | | | |
|---|---|---|---|
| 2,535,243 | 12/1950 | Taylor................................ | 35/35 B |
| 2,782,528 | 2/1957 | Wastl................................. | 35/35 B |
| 3,322,485 | 5/1967 | Williams........................ | 350/160 LC |
| 3,499,112 | 3/1970 | Heilmeier et al............. | 350/160 LC |
| 3,674,342 | 7/1972 | Castellano et al............ | 350/160 LC |

*Primary Examiner*—Ronald L. Wibert
*Attorney*—Peter J. Gaylor

[57] ABSTRACT

An electro-optic device for improving reading ability comprises reading matter over which is placed a pair of parallel transparent insulating plates forming a sandwich, each of the plates being coated on the inside surface with a spaced array of parallel closely-spaced transparent electrode bands, the direction of the bands on one plate being disposed perpendicularly to and insulated from those on the other, the electrode crossings thus forming a series of rows of separate reading panels disposed in register with the reading matter. A thin layer of transparent insulating material covers the coated surface of at least one plate and a thin layer of transparent nematic liquid crystal composition capable of entering a stage of non-destructive opacity, when subjected to a threshold voltage, is disposed between the plates. A source of voltage is provided to impress a variable voltage across the electrodes, the voltage ranging from below the threshold value of the nematic liquid to a voltage above the saturation value, and sequential switching means is connected between the voltage source and the electrodes and it is designed, first, to impress at least a saturation voltage on the panels whereby they become opaque with respect to the reading matter, and then sequentially to reduce the voltage on the panels to below the threshold value, in reading relation, whereby the panels are made sequentially transparent.

12 Claims, 6 Drawing Figures

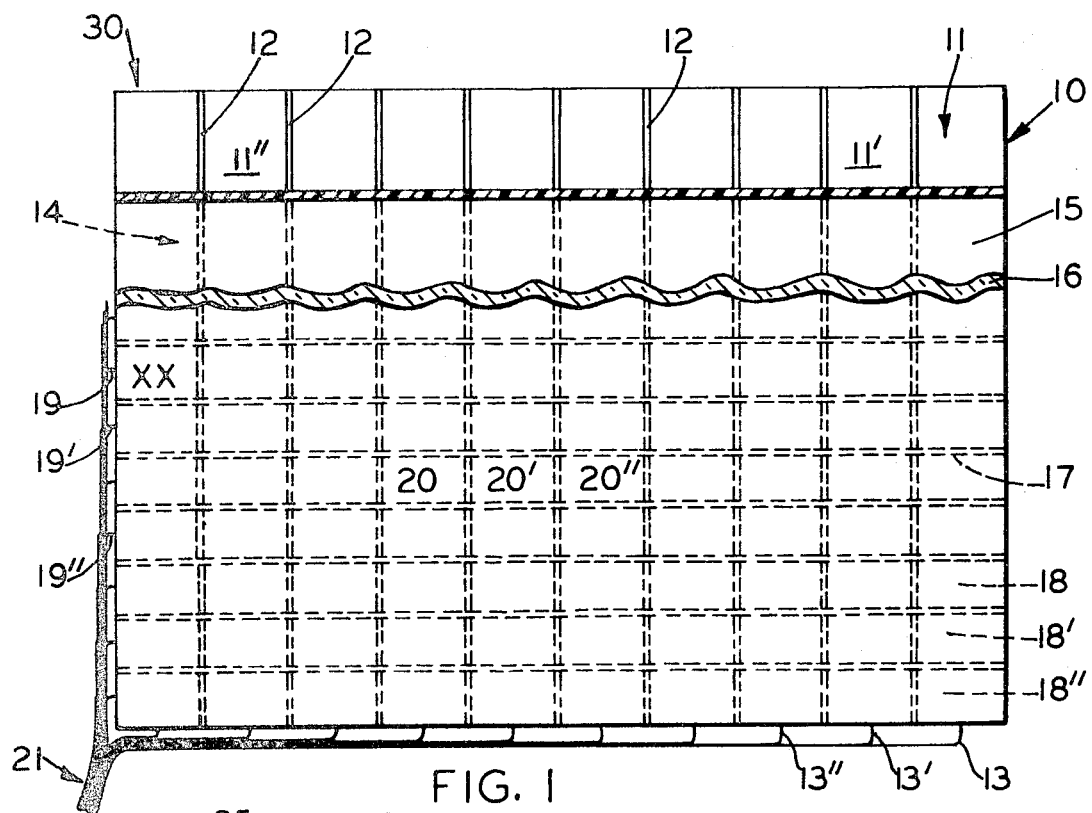
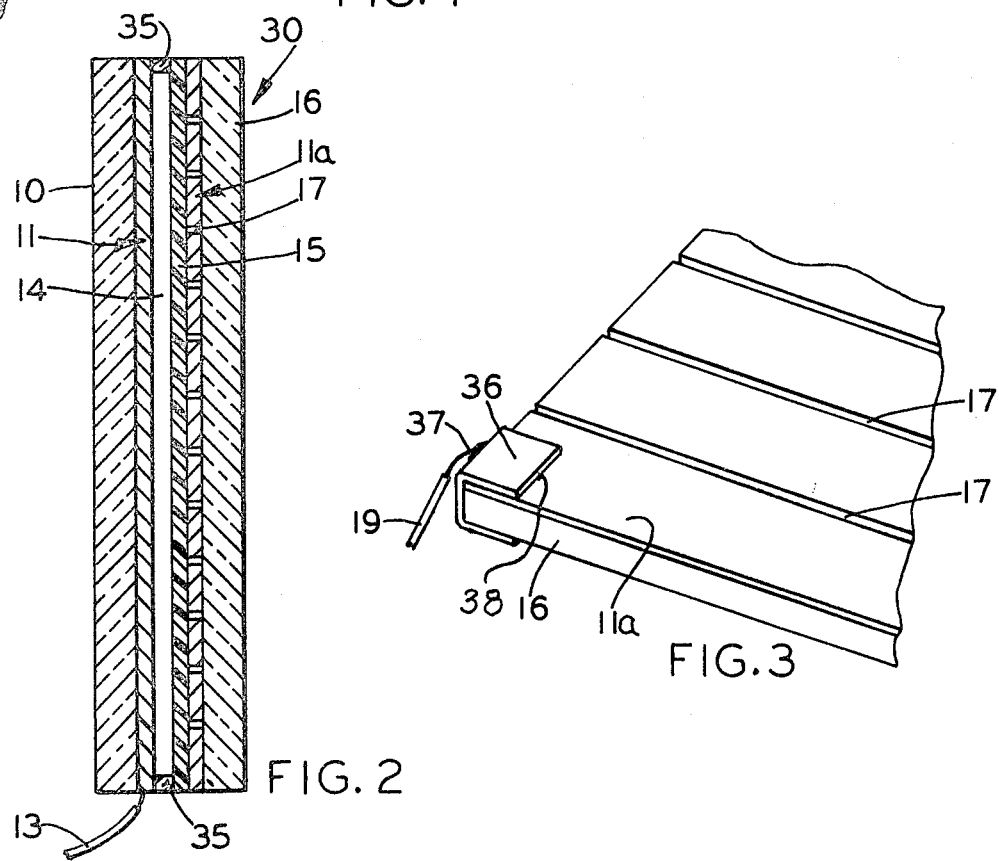

ELECTRO-OPTIC DEVICE FOR IMPROVING READING ABILITY

BACKGROUND OF THE INVENTION

This invention deals with an electro-optic device to improve reading ability. Prior art reading machines, practically all of which have been based on mechanical-optic arrangements, have been subject to many disadvantages. Some employ optical projection at atypical reading distances. Others are audibly disturbing to the user as well as to other individuals. Many are not readily portable. A number of them do not provide a true horizontal attack and, if they do, the reading material is not presented in a manner consistent with natural saccadic eye movements. Other disadvantages of such prior art machines include poor, or lack of, adjustability for the span of recognition and duration of fixation, and need for specially printed material, inability to operate with ordinary reading light, and necessity for a darkened room.

A search of the prior art revealed U.S. Pat. No. 3,322,485 which discloses an electro-optical element using an organic nematic liquid for making optical displays. Although seguential and cyclical energization of the conductive electrodes are mentioned, these are done for forming characters, or for the formation of a picture display, wherein the opaque form of the nematic liquid is the utile form when background reflection is not required, whereas, in the present invention, the transparent form of the nematic liquid is employed in effecting the reading operation.

In U.S. Pat. No. 3,499,112, an electro-optical device employs a glass sandwich between which a nematic liquid crystal is subjected to a voltage field for optical display purposes. Here, also, in non-reflection applications, the turbulent or opaque condition of the liquid crystal is the utile form.

Other U.S. Pat., such as Nos. 3,503,672, 3,503,673 and 3,519,330 have been directed to electric pulsing or bias involving nematic liquid crystals, but they, also, have employed such operations for forming opaque displays as the useful products of their operations.

SUMMARY OF THE INVENTION

According to the present invention, a silent, portable, easily-adjustable reading device is provided for training individuals to read rapidly by directing saccadic eye movements. One of the main features of the invention is a sandwich of glass or other transparent insulating material provided with separate reading area portions, the transparency of which may be controlled and sequenced so as to move, for example, as the eye moves saccadically along a line of printed matter (the latter being disposed in register under said sandwich and made visible when said area portions are made transparent).

The sandwich, otherwise referred to as the electro-optic unit, contains a thin layer of nematic liquid crystal composition (light valve) which undergoes or exhibits an essentially non-destructive turbulence or opacity when subjected to an electric voltage. This turbulence, which is restricted only to the area of applied voltage, causes an efficient scattering of light (dynamic scattering) incident to that region, thus making opaque the nematic layer in that region, so that the reading matter disposed underneath is not discernable. The degree of light scattering may be varied by changing the impressed voltage between a minimum threshold value needed to initiate the turbulence, to a saturation value above which there is very little, if any further scattering.

BRIEF DESCRIPTION OF THE DRAWINGS

The invention will be more readily understood by reference to the accompanying drawings in which a preferred embodiment is described, and in which:

FIG. 1 shows a front elevational view, partly in stripped form, of a sandwich viewing plate of the present invention;

FIG. 2 presents an enlarged cross-sectional side view of the plate shown in FIG. 1;

FIG. 3 shows a corner portion of a substrate plate, indicating how lead connections are attached thereto;

The same numerals refer to the same or similar parts.

DESCRIPTION OF THE PREFERRED EMBODIMENTS

Figure 4:
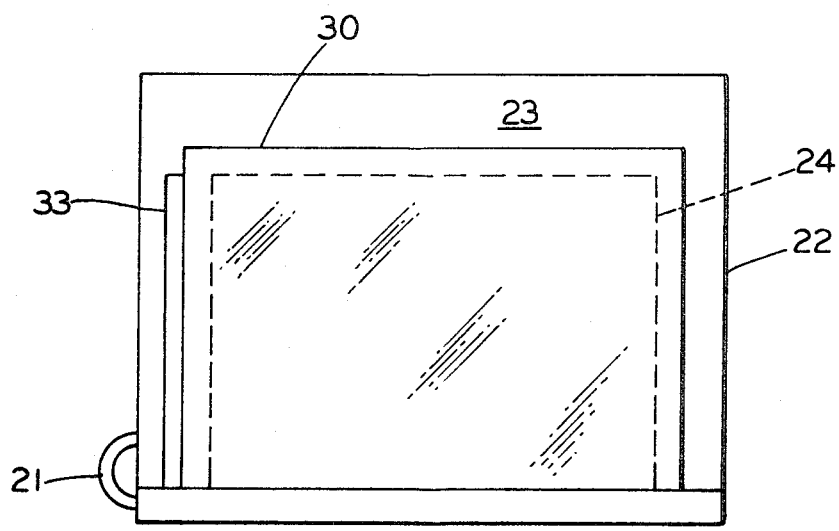
FIG. 4 depicts a front elevational view of a stand holding a sheet of printed matter and a viewing plate disposed thereover for sequential reading of the printed matter at a desired speed.

The sandwich view plate (electro-optic unit) of the present invention is exemplified by that indicated generally in FIGS. 1 and 2. Rear glass plate 10 is completely coated on its inside surface with a transparent conductive layer 11 of tin oxide, or the like. Then, vertical scoring lines 12 are made with a sharp tool, at regularly-spaced intervals, penetrating and removing the conductive layer 11, thus producing vertical lines 12 of insulation of about 0.01 inch width, or even less, thereby providing separate vertical strip or band electrodes 11', 11'', etc. To the naked eye, the glass surface does not reveal any discontinuity in such a case. Each electrode is provided with a lead, such as leads 13, 13', 13'', etc.

The inner surface of the top plate 16 is likewise coated with a layer of conductive transparent material, such as layer 11a, and the layered surface is likewise scored, but with horizontal scoring lines 17, thus providing horizontal conductive band electrodes 18, 18', 18'', etc. Leads 19, 19', 19'', etc., are connected to the ends of the horizontal electrodes.

The inner surface of coated glass plate 16 is then covered with a thin film or sheet of insulating plastic 15, and the plates are assembled into a sandwich 30, as in FIGS. 1 and 2. Spacers or shims 35 are disposed at the edges between the plates to provide a space of less than 0.001 inch, and, desirably, about 0.0005 inch width, in which the thin film 14 of nematic liquid is contained. This space should be completely filled with the liquid. When proper voltage is applied on both the vertical and horizontal electrodes, the turbulence or opacity of the nematic liquid 14 takes place at the overlap or crossing of an energized vertical electrode with an energized horizontal electrode, thereby creating a prospective reading panel, such as panel 20, 20', or 20''. Both insulated vertical leads 13, 13', 13'', etc., and horizontal leads 19, 19', 19'', etc., are gathered into a cable 21.

The manner of connecting the leads to the electrode ends of electro-optic unit 30 is described in FIG. 3.

Glass plate 16, on which conductive coating 11a is deposited, has a very thin conductive (e.g., copper) clip 36 attached in contact with coating 11a. The end 37 of lead 19 was previously soldered to the conductive clip and the junction of the clip and the coating is secured by use of a conducting epoxy cement 38.

When in operation, switch 26 (FIG. 5) is turned on, thus energizing all electrodes to above the threshold value, thereby making opaque all panels 20, 20', 20'', etc., of sandwich plate 30, and the reading matter on the exposed page of book 24 is not visible to the reader. By use of three fixed voltages, an electric grid pattern is arranged so as to cause the voltage at the overlap between any given pairs of electrodes to fall below the threshold level, whereby such panels 20, 20', 20'', etc., become successively transparent, thus enabling the viewer to read the page of book 24. Since all of the other electrode crossings have fields above the saturation level, they remain opaque. Hence, by proper command sequencing, the transparent area can be moved from panel to panel, horizontally along a reading line, or along two or more lines of any desired height, or vertically along one, two or more columns of any desired width, or any desired combination thereof. Conventional arrangements may be effected to provide for the required switching function to cause the opaque reading area to become transparent in any desired sequence. Conventional mechanical, electronic or electro-mechanical switching means may be employed to effect this switching function.

In order to explain this switching procedure, we can assume that the dynamic scattering saturation for a particular nematic liquid crystal composition and configuration employed would be, say, 100 volts for the spacing used. There may be provided three voltages: Plus 50, minus 50 and plus 150 volts. At the outset, the voltage at all electrode crossings can be made to be 100 volts or more, which is above the saturation value for effecting the dynamic scattering. With such a voltage applied, all panels 20, 20', 20'', etc., of the reading plate 30 will be opaque to the reading matter behind the panel. Now, if electrodes 19, 19', 19'', etc., and 13, 13', 13'', etc., are sequentially switched so as to result in a zero voltage at the crossings, the panels 20, 20', 20'', etc., will become sequentially transparent, thus making the reading matter, such as XX in FIG. 1, visible to the reader. Because the rest of the panels have a voltage above the saturation value impressed across the vertical and horizontal leads and electrodes, the nematic liquid therein will be subjected to dynamic scattering, so that the panels will remain opaque. It is thus possible to effect a sequential voltage switching for the panels 20, 20', 20'', etc., and, by turning knob 31, any desired controlled sequential speed may be attained to enable the saccadic movements of the reader's eyes to read the "transparentized" areas of the sandwich as they become exposed.

As is apparent from the foregoing, it is possible to "transparentize" the panels either horizontally or vertically, or in any desired pattern, and in any desired width or height, as well as at any desired speed. It is, of course, essential that the nematic liquid crystal composition be one which will have a suitable response speed, i.e., opacity to transparency conversion rate, and vice versa, without any objectionable time lag for the speeds selected.

Figures 5, 6:
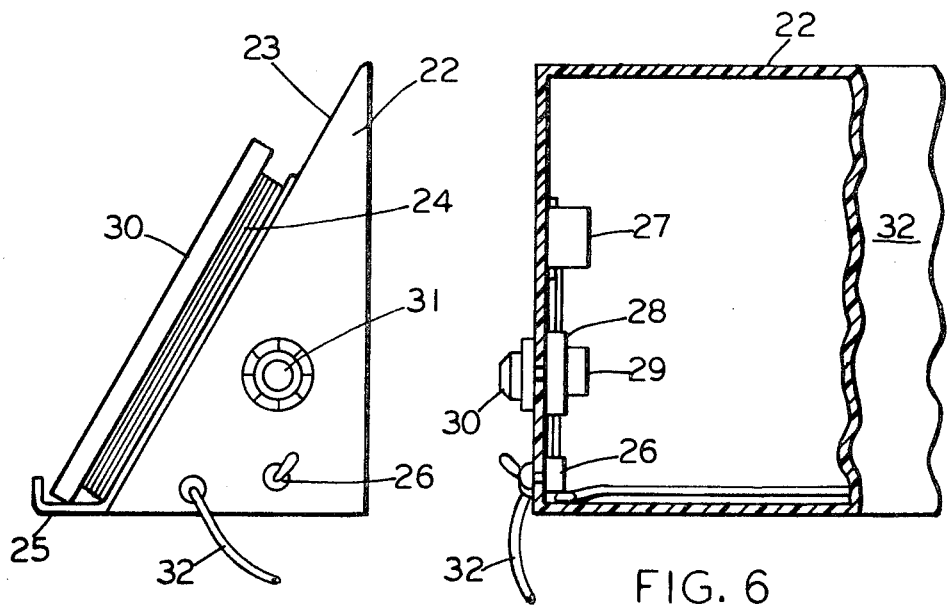
FIG. 5 illustrates a side elevational view of the unit shown in FIG. 4.
FIG. 6 is a rear elevational view of a part of the stand of that of FIG. 4, with the back panel cut away.

In FIGS. 4-6, a viewing plate, of the type illustrated in FIGS. 1-2, is shown as employed for reading use. A stand 22, made of wood, plastic, or other suitable material, has a tilted (up to vertical position) forward face 23, on which may be placed the open book 24, or other printed matter to be read. A projecting lipped edge 25 extending from the bottom of the stand serves to support the book. The viewing plate 30 is disposed over the open page of book 24. Cover 33 serves to protect the otherwise exposed leads of the horizontal electrodes if they are not contained in the sandwich.

Cable 21 is lead into the inside of stand 22, wherein are mounted switch 26, transformer 27, sequential switch 28 with motor 29 for commutator rotation and with turn dial 31, and other electrical elements. All of the electrical elements are of conventional type and sequential switching is also conventional and may be similar to that employed in U.S. Pat. No. 3,499,112. Electric lead 32 is connected to a source of electric power. Back panel 32 of stand 22 is partially cut away in FIG. 6.

The prior art on nematic displays specifies that the electrodes must be in direct contact with the liquid crystal material, thus necessitating the use of relatively thick liquid crystal films to avoid inter-electrode shorting between plates. However, for the purpose of the present invention, very thin films of the nematic liquid are necessary. One reason is that the nematic liquid, even in its non-turbulent state, is not water clear. Furthermore, when very thin films of such liquid crystals are used in direct contact with bare electrodes, it is very difficult to prevent inter-electrode arcing.

Although some of the display prior art refers to the desirability of thin films of 5 to 15 micron thickness for the nematic liquid, it is noteworthy that, in describing their actual devices for display use, they specify thicknesses of 1 or ½ mm., which is 50 to 100 times greater than the desired thickness, thereby indicating the inability to achieve a practical display with the thin films desired.

Fortunately, it has been found that dynamic scattering of the liquid crystal may be effectively initiated without direct contact of the liquid crystal with the electrodes. This finding makes it possible to insulate very effectively with very thin film transparent insulation, either the horizontal or the vertical (directional) electrodes, or both, and still obtain the required opacity, thus making it possible for the reader to see well through the very thin nematic liquid layer of the sandwich structure.

It is desirable that the transparent substrate plates 10 and 16 of the sandwich have parallel inner faces to insure against arcing between electrodes. The most desirable materials for the purpose are glass plates, the surfaces of which have been ground or otherwise formed, to insure parallelism. The surface of the upper plate may be conventionally treated to eliminate reflection problems. Other plate materials which may be used are plastic sheets, such as those made of polymethyl methacrylate, sold under the trademark "Lucite," as well as other transparent plate materials. It is, of course, necessary that such plates be insoluble in the nematic liquid employed, and not subject to any other adverse effects therefrom.

The nematic liquid crystal composition used in the present invention may be any one, or a combination, of the compounds described in U.S. Pat. Nos. 3,322,485, 3,499,702 and 3,540,796. However, it is preferred to use liquid crystal compositions which will convert from opacity to transparency, and vice versa, at room temperatures. An example of such a material is p-methoxybenzylidine, p-n-butyl aniline (4-methoxy-4'-n-butyl-benzilidine aniline), marketed commercially under the trademark "MBBA" and having a molecular weight of 267.39 and an average refractive index of 1.60. Its nematic temperature range is 10° to 48° C, and it exhibits a strong birefringence and a high dispersion. Although such compositions are milky in appearance when viewed in their containers, they are transparent when employed in the form of very thin films used herein.

In the sandwich 30, the nematic crystal layer 14 is desirably of a thickness of not over about 0.001 inch and desirably 0.0005 inch, or even less. Since nematic compositions are now available having an opacity-transparency conversion (exposure) rate of about 30 frames per second, this value is adequate for the present purpose.

The material suitable for the preparation of the transparent electrodes (e.g., 11' or 18'), of the present invention, may be a film of molybdenum oxide, about 1.0 micron in thickness, which is thermally evaporated by conventional means at a pressure of about $10^{-5}$ torr. However, a preferred material for this purpose is a transparent indium oxide or tin oxide film material marketed commercially under the trademark "Nesatron." It is, of course, possible to coat or otherwise form the inside surfaces of said substrate plates with the parallel electrodes by use of a mask.

The non-conductive material 15 used for covering one or more series of directional electrodes may be made of varnish, resin, deposited silicon dioxide, glass, or the like. One of the most desirable materials for this purpose is a very thin sheet of insulating plastic, such as polyethylene terephthalate, marketed commercially under the trademark "Mylar C." This sheet material, which may have a thickness of about 0.0003 inch to about 0.0005 inch, is employed to cover all surfaces of either or both directional electrodes. Another suitable film for such use is a plastic sheet sold commercially under the trademark "Saran."

In operation, when reading matter is being sequentially "transparentized," it is possible either to allow the already-read matter to remain transparent, or to merely sequentially "transparentize" the matter to be read, while all of the remaining panels are opaque. Switching procedures for effecting such procedures are well known in the art.

We claim:

1. An electro-optic device disposable over a sheet of reading matter for improving reading ability, comprising:

a pair of transparent insulating plates forming a sandwich, each of said plates having a coating on the inside surface of a spaced array of parallel transparent electrode bands, the electrode bands on one plate being disposed perpendicularly to those on the other, said spaced electrode bands forming at their crossings, a series of rows of separate reading panels disposed in register with said reading matter, a thin layer of transparent insulating material covering the electrode-coated surface of at least one plate, a thin layer of transparent nematic liquid crystal composition having the property of entering a stage of non-destructive opacity when subjected to a threshold voltage disposed between said plates, a source of electric voltage designed to impress a variable voltage through said electrode bands and across said sandwich, said voltage ranging from below the threshold value to above the saturation value of said nematic liquid, and sequential switching means connected between said voltage source and said electrode bands and designed first to impress at least a saturation voltage on said panels whereby they become opaque with respect to said reading matter, and then sequentially to reduce said voltage on said panels to below the threshold value in reading relation, whereby said panels are made sequentially transparent to make visible said reading matter in reading relation.

2. An electro-optic device, according to claim 1, wherein said electrode bands are separated by an insulating scoring line.

3. An electro-optic device, according to claim 1, in which said layer of insulating material comprises a thin sheet of plastic having a thickness of not over about 0.0005 inch.

4. An electro-optic device, according to claim 1, in which said layer of nematic liquid has a thickness of not over 0.001 inch.

5. An electro-optic device for improving reading ability, comprising:

a sheet of reading matter, a pair of parallel transparent insulating plates forming a sandwich, each of said plates having a coating on the inside surface of a spaced array of parallel transparent electrode bands, the electrode bands on one plate being disposed perpendicularly to those on the other, said spaced electrode bands forming, at their crossings, a series of rows of separate reading panels disposed in register with said reading matter, a thin layer of transparent insulating material covering the coated inside surface of at least one plate, a thin layer of transparent nematic liquid crystal composition having the property of entering a stage of non-destructive opacity when subjected to a threshold voltage disposed between said plates, a source of electrical voltage designed to impress a variable voltage through said electrode bands and across said sandwich, said voltage ranging from below the threshold value to above the saturation value of said nematic liquid, and sequential switching means connected between said voltage source and said electrode bands and designed first to impress at least a saturation voltage on said panels whereby they become opaque with respect to said reading matter, and the sequentially to reduce said voltage on said panels to below the threshold value in reading relation, whereby said panels are made sequentially transparent to make visible said reading matter in reating relation.

6. An electro-optic device, according to claim 5, in which said layer of nematic liquid has a thickness of not over about 0.001 inch.

7. An electro-optic device, according to claim 5, wherein said layer of insulating material comprises a layer of sheet plastic having a thickness of not over about 0.0005 inch.

8. An electro-optic device, according to claim 5, wherein said electrode bands comprise wide bands separated from each other by insulating scoring lines.

9. An electro-optic device for improving reading ability, comprising:
- a stand having a raised forward face and protruding bottom retaining means on which a sheet of printed matter may be supported, a sandwich reading plate disposable on said retaining means and over said printed matter and comprising:
- a pair of parallel transparent insulating plates forming a sandwich, each of said plates having a coating on the inside surface of a spaced array of parallel transparent electrode bands, the direction of the electrode bands on one plate being disposed perpendicularly to those of the other, said spaced electrode bands forming, at their crossings, a series of rows of separate reading panels disposable in register over said printed matter,
- a thin layer of transparent insulating material covering the coated inside surface of at least one plate,
- a thin layer of transparent nematic liquid crystal composition having the property of entering a stage of non-destructive opacity when subjected to a threshold voltage disposed between said plates,
- a source of electric voltage designed to impress a variable voltage through said electrode bands and across said sandwich, said voltage ranging from below the threshold value to above the saturation value of said nematic liquid, and
- sequential switching means mounted on said stand and connected between said voltage source and said electrode bands and designed first to impress at least a saturation voltage on said panels whereby they become opaque with respect to said printed matter, and then sequentially to reduce said voltage on said panels to below the threshold value, in reading relation, whereby said panels are made sequentially transparent to make visible said printed matter in reading relation.

10. An electro-optic device, according to claim 9, having switching speed control means for varying the speed of said sequential switching.

11. A process for improving reading ability, comprising:
- placing, over a sheet of reading matter, a pair of parallel transparent insulating plates forming a sandwich, each of said plates being coated on the inside surface with a spaced array of parallel transparent electrode bands, the direction of the electrode bands on one plate being disposed perpendicularly to those on the other, said spaced electrode bands forming, at their crossings, a series of rows of separate panels disposed in register over said reading matter, the coated inside surface of at least one plate being covered with a sheet of thin transparent insulating plastic, and said sandwich enclosing a thin layer of transparent nematic liquid crystal composition having the property of entering a stage of non-destructive opacity when subjected to a threshold voltage, impressing an electrical voltage above the saturation value on said electrode bands, whereby said panels are made opaque to said reading matter, and
- sequentially switching said voltage to below said threshold value on said panels, in reading relation, whereby said panels are made sequentially transparent, and the said reading matter is thus made visible in reading relation.

12. A process, according to claim 11, wherein the electrode bands are made by coating the insulating plates with a transparent conductive layer, and then scoring the layered surfaces at spaced intervals to provide insulated bands thereon.

* * * * *